INVENTOR
Willi Minkenberg

Nov. 24, 1970        W. MINKENBERG                3,541,890
       DEVICE FOR ARRESTING THE TURNING TABLE OR THE
                    LIKE OF MACHINE TOOLS
Filed Aug. 20, 1968                          2 Sheets-Sheet 2

INVENTOR
Willi Minkenberg
By (signature)

3,541,890
Patented Nov. 24, 1970

3,541,890
DEVICE FOR ARRESTING THE TURNING TABLE OR THE LIKE OF MACHINE TOOLS
Willi Minkenberg, Monchen-Gladbach-Rheindahlen, Germany, assignor to Schiess Aktiengesellschaft, Dusseldorf-Oberkassel, Germany
Filed Aug. 20, 1968, Ser. No. 754,091
Claims priority, application Germany, Aug. 23, 1967, 1,627,283
Int. Cl. B23b 27/24
U.S. Cl. 74—816        6 Claims

ABSTRACT OF THE DISCLOSURE

A locating device for a pair of relatively rotatable members in which one of the members has locating sockets therein and the other of said members has locating pins therein reciprocable into and out of engagement with the sockets. Each pin is slidable in a bushing which has a tapered end part received in a tapered hole in the pertaining member. Each bushing is engaged by a block moveable in the member carrying the pins and bushings, a single shaft is journalled in the blocks and connected to the pins for moving them to and from socket engaging position. When the pins engage the sockets, further rotation of the shaft will move the blocks which will, in turn, move the bushings in a direction to cause contraction thereof, thereby eliminating any lost motion between the pins and the member by which they are carried, thus providing for precise location of the members in indexed position.

Figure 1:
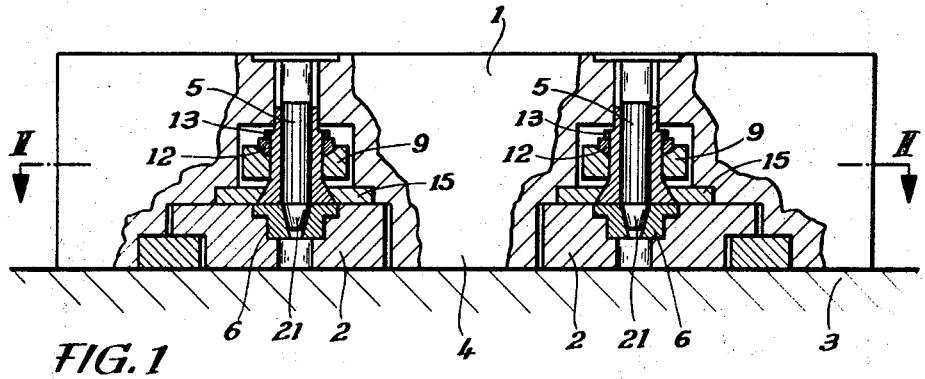

In connection with machine tools having a turning table on which the work piece is chucked, frequently the work piece has to be subjected to machining operations during which the turning table is stopped while the machining operations are carried out with a tool having a drive of its own. With machining operations of this type, a precise fixing of the turning table is a necessity. The turning table must be arrested precisely centrally with regard to the turning axis while the play of the guiding means for the rotation of the turning table and the play in the direction of rotation of the turning table have to be eliminated.

Heretofore known arresting devices for this purpose are formed by clamping devices prior to the tightening of which the position of the turning table is determined and fixed by means of optical measuring devices.

In addition thereto, there have become known mechanically effective fixing devices which, however, have only a limited repeat precision because the errors with regard to the centering as caused by errors in the friction bearings or in the antifriction bearings cannot be excluded.

Furthermore, a fixing device has become known for a turning table according to which in the turning table are provided two axially displaceable fixing pins which are arranged on a common diameter line of the turning table symmetrically with regard to the axis of rotation of the turning table. These fixing pins are adapted by means of their conical ends to engage a conical guiding means in the lower portion of the turning table. A fixing device of this type represents a redundancy in determination because not only the guiding means for the rotary movement of the turning table but also the fixing pins have to be arranged precisely with regard to each other. Thus, maximum manufacturing precision is necessary in order to make said last mentioned fixing device useful. If only one fixing pin is employed which cooperates with the centering of the turning table, the errors in the turning movement of the central bearing having a disadvantageous effect and bring about lack of precision in the fixing of the turning table. Furthermore it is unavoidable that the fixing pins in view of the necessary axial displaceability thereof have a guiding play with the result that the fixing pins may, depending on the direction of rotation from which the fixing is effected, rest one time against one guiding surface and another time against the oppositely located guiding surface. Even with smallest guiding play, positioning errors will occur.

Also with turning tables having two fixing pins in an arrangement of the type set forth above, in which a rough centering is completely relieved after turning of the table, due to the guiding play, the fixing operations will not permit a maximum reproduction precision.

It is, therefore, an object of the present invention to provide a fixing device for turning tables and the like of machine tools, which will overcome the above mentioned drawbacks.

It is another object of this invention to provide a fixing device for turning tables and the like of machine tools with two fixing pins which are arranged in the turning table on a common diameter line of the turning table symmetrically with regard to the axis of rotation thereof and which are axially displaceable and which with their conical ends are insertable into conical guiding means in the lower portion of the turning table, while in this way during the fixing operation eliminating all guiding plays so that any lack of precision in the reproduction process will be avoided.

These and other objects and advantages of the invention will appear more clearly from the following specification in connection with the accompanying drawings, in which:

FIG. 1 diagrammatically illustrates a section through a turning table equipped with a fixing device according to the invention mounted on a support.

Figure 2:
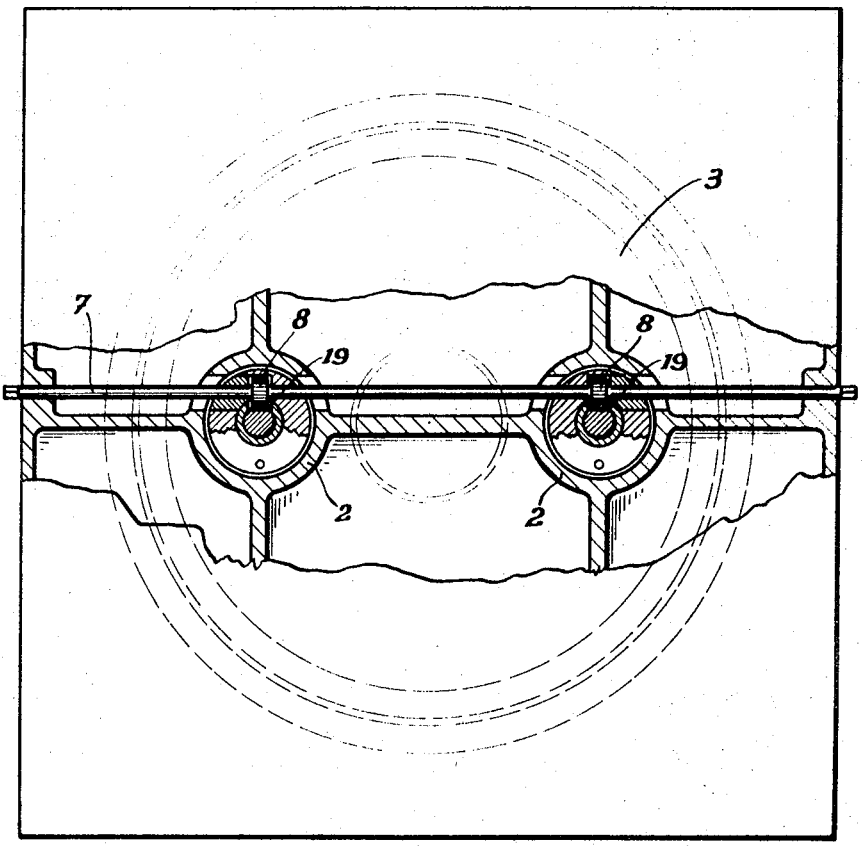

FIG. 2 represents a section taken along the line II—II of FIG. 1.

Figure 3:
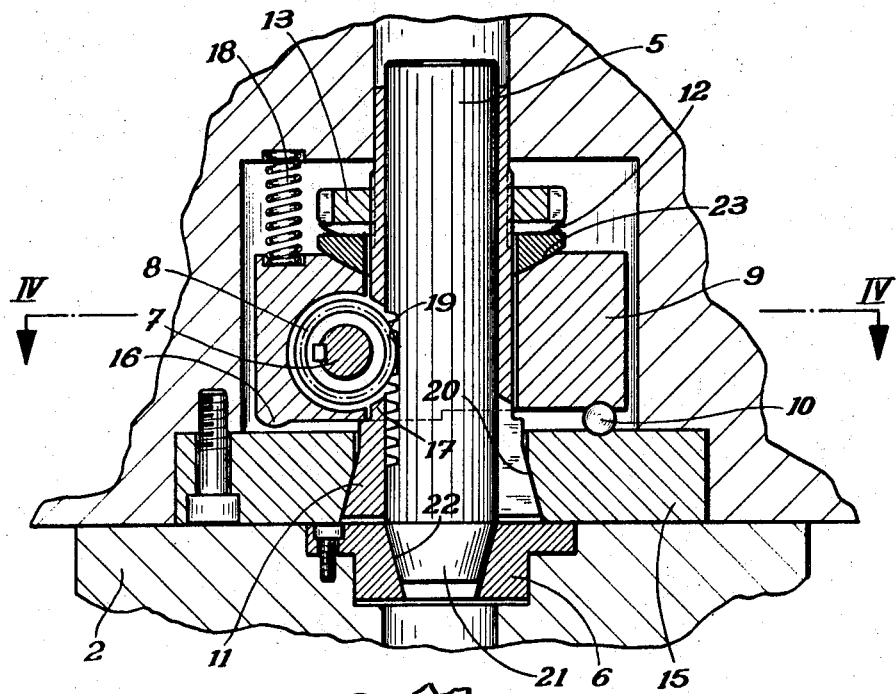

FIG. 3 diagrammatically illustrates on a somewhat larger scale than that of FIGS. 1 and 2 a section of an individual fixing device according to the invention.

Figure 4:
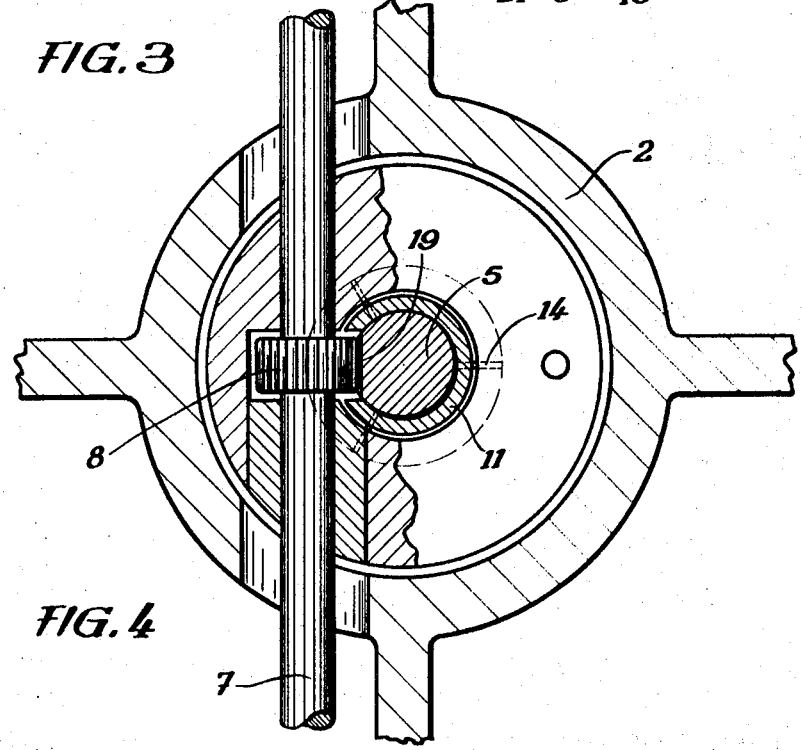

FIG. 4 is a section taken along the line IV—IV of FIG. 3.

The present invention consists primarily in that the fixing pins are within the turning table respectively surrounded by an axially movable bushing, the two bushings having those ends thereof which taper toward the turning table and face the lower portion of the turning table engage corresponding conical guiding means in the turning table. The adjusting force acting upon the fixing pins for the axial displacement of the fixing pins toward the lower portion of the turning table is absorbed by the opposite ends of the bushings.

This fixing device brings about that first the two fixing pins which axially protrude from the turning table move into the pertaining conical guiding means of the lower portion of the turning table whereby the fixing pins are arrested precisely in the lower portion of the turning table without any lateral play. Inasmuch as the adjusting force acting upon the fixing pins is absorbed at that end of the bushing which is adjacent to the turning table, said bushing extending around the respective fixing pin, it will be appreciated that with increasing adjusting force acting upon the fixing pin, the bushing is displaced in the opposite direction while in view of the slotting of its conical end said bushing surrounds the fixing pin in a clamping manner and pulls itself into the conical guiding means of the turning table whereby a precise aligning of the turning table on the fixing pin is effected which was previously aligned in the lower portion of the turning table. Thus, by engaging the fixing pin it is brought about that in view of the oppositely effective absorption of the adjusting force the bushing is axially displaced for eliminating the guiding play and during this displacement the bushing will, while exerting a clamping force on the fixing pin in radial direction, simultaneously axially and radially outwardly engage the guiding means of the turning table in a play-free manner.

According to a further development of the present invention, the adjusting force may be exerted through the intervention of a turnable shaft which extends in a direction transverse to the fixing pin and is journalled in a rocker bearing which in the turning table rests against the lower portion of the turning table. This shaft is operatively connected to a rack in the fixing pin by means of a pinion extending transverse through the bushing, the rocker bearing extending with axial play below an axially adjustable collar on that end of the bushing which is adjacent the turning table. If by turning the shaft by means of the pinion the fixing pin has its conical end engage the lower portion of the turning table, the rocker bearing carries out a slight rocking movement and brings about a displacement of the bushing in a direction which is opposite to the adjusting direction for the fixing pin so that the play-free embracing of fixing pin and lower portion of the turning table on one hand and bushing and turning table on the other hand will be effected.

In order to prevent a premature clamping of the fixing pin or fixing pins, the present invention provides that the rocker bearing is under the influence of a spring force directed toward the lower portion of the turning table so that it is first necessary to overcome this spring force before an axial displacement of the bushing can be brought about by means of the supporting force inherent to the adjusting force.

Referring now to the drawings in detail, the arrangement shown therein comprises a turning table 1 and a fixing ring 2 which forms a part of the lower portion 3 of the turning table and is connected thereto in any convenient manner. During its rotation, the turning table 1 is by means of a king pin 4 roughly centered within the fixing ring 2.

As will be seen from FIG. 2, two fixing pins 5 are arranged along a common diameter line of the turning table 1, said pins 5 being axially displaceable in the turning table. A rotatably journalled shaft 7 extends parallel to the said common diameter line and is within the area of the fixing pins 5 provided with pinions 8 meshing with a rack 19 of the respective fixing pin 5 pertaining thereto. The adjusting force is conveyed to the fixing pins 5 through the intervention of the rotatably journalled shaft 7. For purposes of establishing a meshing engagement of the pinions 8 with the rack 19 of the fixing pins 5, the respective pinion 8 extends through a bushing 17 (FIG. 3) extending around the fixing pin 5. The lower end 11 of the bushing 17 has an outer conical shape while tapering toward the turning table 1. The conical end 11 engages a conical guiding member 20 in plate 15 which forms a portion of the turning table 1 and, therefore, is fixedly connected thereto. An axial displacement of the bushing 17 toward the turning table 1 brings about that the slotted end 11 of the bushing 17 will engage the fixing pin 5 in a clamping manner because during the displacement by the conical guiding member 20 in plate 15 a radially inwardly directed force is exerted upon the conical end 11. Thus, a clamping engagement of the conical end 11 with plate 15 and simultaneously with the fixing pin 5 will be effected.

The conical end 21 of the fixing pin 5 will during its displacement toward the lower portion 3 of the turning table 1 engage the conical guiding member 22 of the fixing bushing 6 which is located within the fixing ring 2 which latter is fixedly connected to the lower portion 3 of the turning table 1.

That end of the bushing 17 which is adjacent the turning table 1 has screwed thereonto a supporting nut 13. This nut 13 forms a collar which is axially displaceable on the bushing 17. Below the said collar there is provided a rocker bearing member 9 in which the rotatable shaft 7 is journalled. That side of the rocker bearing member 9 which faces the nut 13 is provided with a spherical cup 23 in which the spherical disc 12 is located through the intervention of which during the rocking of the rocker bearing member 9 the latter will rest on the nut 13 of the bushing 17. The rocking of the rocker bearing member 9 is effected upwardly around the ball 10 which is located between the rocker bearing member 9 and the plate 15. The downward rocking movement is limited by the nose 16 which faces the plate 15, said nose 16 forming a part of the rocker bearing member or block 9. Springs 18 resting on one hand on the block 9 and on the other hand on the turning table 1 act upon the block 9 in the direction toward the lower portion 3 of the turning table 1.

The operation of the fixing device according to the present invention is as follows. If, in conformity with FIGS. 1 and 2, the turning table 1 is roughly moved into such a position that the axes of the fixing pins 5 are in alignment with the axes of the bushings 6 in the portion 3 of the turning table 1, the rotatable shaft 7 is, with regard to FIG. 3, turned in clockwise direction. In view of the pinions 8 and the rack 19 forming part of the fixing pins 5, the fixing pins 5 are displaced in axial direction toward the lower portion 3 of the turning table 1 and by means of their conical ends 21 engage the bushings 6 in a play-free manner. When shaft 7 is turned further, the force of spring 18 will be overcome due to the fact that the pressure, which is conveyed through the fixing pin 5 in downward direction within the area of the conical end 21 onto the bushing 6, causes the shaft 7 to bend in upward direction. The blocks 9 will thus be subjected to a tilting movement as a result of which the spherical disc 23 will engage the nuts 13 of the bushing 17 and will displace the latter in a direction which is opposite to the direction of displacement of the fixing pins 5. This displacement brings about a clamping of the bushing ends 11 within the guiding means 20 and simultaneously causes a play-free clamping of the fixing pins 5 within the ends 11 of the bushings 17. In this way it will be assured that the fixing pins 5 are arrested in a play-free manner in the turning table 1 as well as in the lower portion 3 of the turning table. The release or disengagement of the fixing device is brought about by a turning of shaft 7 in opposite direction. After the fixing pins 5 have disengaged the bushings 6 in the lower portion 3 of the turning table, the latter can be turned at will and can again be fixed whenever desired. The design of the fixing device will assure a precise repeat operation of the fixing steps and no faulty adjustment can occur. The fixing operation is independent of the play of the guiding means for the rotation of the turning table because by means of the conical oppositely directed guiding means 20 and 22 a precise self-centering along a common axis will be assured.

It is, of course, to be understood that the present invention is, by no means, limited to the particular design shown in the drawings but also other modifications are possible, the invention being defined by the scope of the disclosure.

What is claimed is:

1. A locating device for use in connection with first and second members relatively rotatable on a predetermined axis which comprises: socket means in one of said members, pin means in the other of said members adapted for being reciprocated into engagement with said socket means in predetermined rotated positions of said members, bushing means in said other member slidably receiving said pin means, means for contracting said bushing means about said pin means when said pin means are in engagement with said socket means thereby to eliminate lost motion between said pin means and said other member so that precise relative positioning of said members in said rotated positions is obtained, said bushing means being slotted and tapered on the end nearest said one member, said other member including guide means in the form of bore means reciprocably receiving said bushing means and being tapered on the end nearest said one member for engaging the tapered end of said bushing means, said means for contracting said bushing means comprising means for moving said bushing means axially in said guide means, said socket means and the one end of said pin means being complementarily tapered, said pin means comprising at least two pins parallel to said axis and located on a diameter passing through said axis and equally spaced from said axis on opposite sides thereof, each said pin having a rack portion thereon, a shaft rotatable in said other member, a pinion on said shaft engaging each said rack portion for simultaneous reciprocation by said pins by rotation of said shaft, and a block moveably mounted in said other member for each said pin and engaging the said bushing for the respective pin, said shaft being journalled in said blocks and being free to deflect relative to said other member at least in the region of said blocks whereby said pins will first seat in their respective sockets and thereafter further rotation of said shaft will move said blocks to move said bushings to cause contraction thereof.

2. A locating device according to claim 1 in which each bushing extends through the pertaining block, a nut on the bushing on the side of the respective block opposite the tapered end of the bushing, a rocker member between each said nut and the pertaining block, and spring means in said other member urging each said block in a direction to permit the pertaining bushing to expand.

3. A locating device according to claim 2 in which each said block tiltably engages said other member on the side of the pertaining pin opposite the side on which the said shaft is located.

4. A locating device according to claim 3, which includes cooperating elements of stop means on each block and said other member to stop the blocks in a predetermined position when released to the influence of said spring means.

5. In a position fixing device especially suitable for machine tools and the like having a turning table member only coarsely centered by a conically tapered means for journalling tolerance between the turning table member and a support member capable of indexing movement with respect to each other and one of which has locating sockets therein and the other of which has a pair of locating pins therein reciprocable into and out of engagement with the sockets, the improvement therewith which comprises a bushing having a tapered end part received in a tapered hole pertaining respectively to each said locating pin slidable in said bushing carried by one of the members, a block moveable in the member carrying said pins and bushings, and a single shaft journalled in said blocks and connected to said pins for moving them to and from socket engaging position, said shaft upon further rotation when said pins engage the sockets correspondingly bringing about movement of said respective bushings in a direction to cause contraction thereof and thereby eliminating any lost motion between the pins and the member carrying the same, thus assuring precise location of the members in indexed position independent of journalling tolerance of the members relative to each other.

6. The improvement according to claim 5, wherein said pins are axially displaceable within the turning table member and said shaft is rotatable in an axis transverse to that of said pins, said shaft being rotatably journalled with respect to the turning table member and being provided with a pinion extending through a corresponding bushing, and a rack portion on each pin and engaged by said pinion so that both said pins are adjustable in common by said shaft conveying the adjusting force.

References Cited

UNITED STATES PATENTS

| | | | |
|---|---|---|---|
| 1,946,835 | 2/1934 | Buhr | 74—816 |
| 2,335,721 | 11/1943 | Zagar | 74—813 |
| 2,827,808 | 3/1958 | Charlat | 74—816 XR |
| 2,873,822 | 2/1959 | Sloan | 74—813 XR |
| 2,905,029 | 9/1959 | Gustafson | 74—813 XR |

FRED C. MATTERN, Jr., Primary Examiner

F. D. SHOEMAKER, Assistant Examiner